US012618128B2

(12) United States Patent
Kim et al.

(10) Patent No.: US 12,618,128 B2
(45) Date of Patent: *May 5, 2026

---

(54) STAINLESS STEEL FOR SEPARATOR OF POLYMER FUEL CELL HAVING EXCELLENT CORROSION RESISTANCE

(71) Applicant: POSCO, Pohang-si (KR)

(72) Inventors: Kwang Min Kim, Pohang-si (KR);
Bong-Wn Kim, Pohang-si (KR);
Bo-Sung Seo, Pohang-si (KR);
Dong-Hoon Kim, Pohang-si (KR);
Mun-Soo Lee, Pohang-si (KR)

(73) Assignee: POSCO, Pohang-si (KR)

( * ) Notice: Subject to any disclaimer, the term of this patent is extended or adjusted under 35 U.S.C. 154(b) by 524 days.

This patent is subject to a terminal disclaimer.

(21) Appl. No.: 17/786,342

(22) PCT Filed: Feb. 10, 2020

(86) PCT No.: PCT/KR2020/001844
§ 371 (c)(1),
(2) Date: Jun. 16, 2022

(87) PCT Pub. No.: WO2021/125436
PCT Pub. Date: Jun. 24, 2021

(65) Prior Publication Data
US 2023/0032485 A1     Feb. 2, 2023

(30) Foreign Application Priority Data

Dec. 19, 2019    (KR) ........................ 10-2019-0170586

(51) Int. Cl.
*C22C 38/44*        (2006.01)
*C22C 38/00*        (2006.01)
(Continued)

(52) U.S. Cl.
CPC ............ *C22C 38/44* (2013.01); *C22C 38/001* (2013.01); *C22C 38/02* (2013.01); *C22C 38/04* (2013.01); *H01M 8/021* (2013.01)

(58) Field of Classification Search
CPC ....... C22C 38/001; C22C 38/02; C22C 38/04; C22C 38/38; C22C 38/44; H01M 2008/1095; H01M 8/021; Y02E 60/50
See application file for complete search history.

(56) References Cited

U.S. PATENT DOCUMENTS 6,171,547 B1    1/2001 Sagara et al.
12,049,688 B2 *  7/2024 Kim ........................ C23C 22/34
(Continued)

FOREIGN PATENT DOCUMENTS

CN        107210458 A      9/2017
JP        08239737 A    *  9/1996
(Continued)

OTHER PUBLICATIONS

NPL: on-line translation of JP-08239737-A, Sep. 1996 (Year: 1996).*
(Continued)

*Primary Examiner* — Jie Yang
(74) *Attorney, Agent, or Firm* — Morgan Lewis & Bockius LLP

(57) ABSTRACT

Disclosed is a stainless steel for a separator of a polymer fuel cell having excellent corrosion resistance. More particularly, disclosed is a stainless steel for a separator of a polymer fuel cell having excellent corrosion resistance in a sulfuric acid environment which is a fuel cell operating environment. According to an embodiment, the stainless steel for a separator of a polymer fuel cell includes, in percent by weight (wt %), 0.09% or less of C, 1.0% or more and less than 2.5% of Si, 1.0% or less (excluding 0) of Mn, 0.003%

(Continued)

or less of S, 20 to 23% of Cr, 9 to 13% of Ni, 1.0% or less (excluding 0) of W, 0.10 to 0.25% of N, and the remainder of Fe and other inevitable impurities, wherein a corrosion resistance index represented by Formula (1) below is 7 or more.

$$3*W+1.5*Si+0.1*Cr+20*N-2*Mn \qquad (1)$$

In Formula (1), W, Si, Cr, N, and Mn represent the content (wt %) of each element.

4 Claims, 5 Drawing Sheets

(51) Int. Cl.
| | | |
|---|---|---|
| *C22C 38/02* | (2006.01) | |
| *C22C 38/04* | (2006.01) | |
| *H01M 8/021* | (2016.01) | |

(56) References Cited

U.S. PATENT DOCUMENTS

| | | | |
|---|---|---|---|
| 2014/0295324 A1 | 10/2014 | Lee et al. | |
| 2017/0342534 A1 | 11/2017 | Kim et al. | |
| 2018/0053948 A1 | 2/2018 | Tarutani | |
| 2018/0080106 A1 | 3/2018 | Teraoka et al. | |
| 2023/0420698 A1* | 12/2023 | Kim ..................... | C21D 8/0226 |

FOREIGN PATENT DOCUMENTS

| | | | |
|---|---|---|---|
| JP | 2003-193206 A | | 7/2003 |
| JP | 2004002960 A | * | 1/2004 |
| JP | 2005-330501 A | | 12/2005 |
| JP | 2007-27032 A | | 2/2007 |
| JP | 2007-254795 A | | 10/2007 |
| JP | 2009-007627 A | | 1/2009 |
| JP | 2009-19228 A | | 1/2009 |
| JP | 2012-514297 A | | 6/2012 |
| JP | 2013-129896 A | | 7/2013 |

| | | | | | |
|---|---|---|---|---|---|
| JP | 5605996 | B2 | 10/2014 | | |
| JP | 2015-507091 | A | 3/2015 | | |
| KR | 10-0361548 | B1 | 11/2002 | | |
| KR | 10-2015-0074682 | A | 7/2015 | | |
| KR | 10-1570583 | B1 | 11/2015 | | |
| KR | 10-2016-0079997 | A | 7/2016 | | |
| KR | 10-2018-0073879 | A | 7/2018 | | |
| KR | 10-2019-0066737 | A | 6/2019 | | |
| WO | WO-2012053431 | A1 * | 4/2012 | .......... | H01M 8/0206 |

OTHER PUBLICATIONS

NPL: on-line translation of WO-2012053431-A1, Apr. 2012 (Year: 2012).*
NPL: on-line translation of JP 2004002960 A, Jan. 2004 (Year: 2004).*
Japanese Office Action dated Jul. 11, 2023 issued in Japanese Patent Application No. 2022-538350 (with English translation).
Chinese Notice of Allowance dated Jul. 12, 2023 issued in Chinese Patent Application No. 202080093504.6 (with English translation).
International Search Report dated Sep. 11, 2020 issued in International Patent Application No. PCT/KR2020/001844 (with English translation).
Korean Notice of Allowance dated Sep. 7, 2021 issued in Korean Patent Application No. 10-2019-0170586.
Korean Office Action dated Mar. 31, 2021 issued in Korean Patent Application No. 10-2019-0170586.
Supplementary European Search Report issued Apr. 19, 2024 for European Patent Application No. 20903013.9.
Extended European Search Report issued Apr. 2, 2024 for European Patent Application No. 20903013.9.
Decision to Grant issued Feb. 2, 2024 for Japanese Patent Application No. 2022-538350 (See English Translation).
Japanese Office Action dated Oct. 5, 2023 issued in Japanese Patent Application No. 2022-538350 (with English translation).
Indian Office Action dated Nov. 11, 2022 issued in Indian Patent Application No. 202217036971 (with English translation).
Chinese Office Action dated Feb. 15, 2023 issued in Chinese Patent Application No. 202080093504.6 (with English translation).

* cited by examiner

STAINLESS STEEL FOR SEPARATOR OF POLYMER FUEL CELL HAVING EXCELLENT CORROSION RESISTANCE

CROSS-REFERENCE OF RELATED APPLICATIONS

This application is the U.S. National Phase under 35 U.S.C. § 371 of International Patent Application No. PCT/KR2020/001844, filed on Feb. 10, 2020 which claims priority to and the benefit of Korean Application No. 10-2019-0170586 filed on Dec. 19, 2019, the entire contents of which are incorporated herein by reference.

TECHNICAL FIELD

The present disclosure relates to a stainless steel for a separator of a polymer fuel cell having excellent corrosion resistance, and more particularly, to a stainless steel for a separator of a polymer fuel cell having excellent corrosion resistance in a sulfuric acid environment which is a fuel cell operating environment.

BACKGROUND ART

Polymer electrolyte membrane fuel cells, which are fuel cells using a polymer membrane having hydrogen ion exchange characteristics as an electrolyte, have a low operating temperature of approximately 80° C. and high efficiency compared to other types of fuel cells. Also, polymer electrolyte membrane fuel cells may be used for vehicles, home appliances, and the like due to quick start, high output density, and simple body structure.

A polymer electrolyte membrane fuel cell has a unit cell structure in which a gas diffusion layer and a separator are stacked on both sides of a membrane electrode assembly (MEA) including an electrolyte, an anode, and a cathode, and a structure in which a plurality of unit cells are connected in series is called a fuel cell stack.

A separator are provided with flow paths to supply a fuel (hydrogen or reformed gas) and an oxidant (oxygen and air) respectively to electrodes and to discharge water that is a product of electrochemical reaction. The separator performs a function of mechanically supporting the MEA and the gas diffusion layer and a function of electrical connection to adjacent unit cells.

Although graphite has been conventionally used as a material for the separators, stainless steels has been widely used in recent years in consideration of manufacturing cost and weight. However, unless a stainless steel used as a separator has sufficient corrosion resistance, corrosion may occur in a sulfuric acid environment which is a fuel cell operating environment. As a result, a problem of a decrease in output of a fuel cell occurs.

Accordingly, austenitic stainless steels to which molybdenum (Mo) is added in the same manner used for stainless steel 316 L, is mainly used as a material of a separator of a polymer electrolyte membrane fuel cell to obtain corrosion resistance and formability. However, the stainless steel 316 L contains molybdenum (Mo) in a large amount of 2% or more. Accordingly, an increase in price of molybdenum (Mo) causes a wide range of fluctuation in price of raw materials, and thus unstable price may result in low price competitiveness. In addition, the conventional stainless steel 316 L has insufficient corrosion resistance in a sulfuric acid environment which is a fuel cell operating environment, so there is a problem that corrosion may occur.

In order to solve these problems, Patent Documents 1 and 2 disclose methods of obtaining corrosion resistance by plasma-treating the surface of a stainless steel separator, and Patent Document 3 discloses a method of obtaining corrosion resistance by coating the surface of a stainless steel separator with gold, platinum, ruthenium, iridium, or the like. However, since these methods require additional surface reforming process or coating process, there are problems of relatively low price competitiveness and a decrease in productivity.

(Patent Document 1) Korean Patent Publication No. 10-1172163

(Patent Document 2) Korean Patent Publication No. 10-1054760

(Patent Document 3) Korean Patent Publication No. 10-1165542

DISCLOSURE

Technical Problem

To solve the above-described problems, provided is a stainless steel for a separator of a polymer fuel cell having excellent corrosion resistance in a sulfuric acid environment which is a fuel cell operating environment.

Technical Solution

In accordance with an aspect of the present disclosure to achieve the above-described objects, provided is an austenitic stainless steel for a separator of a polymer fuel cell including, in percent by weight (wt %), 0.09% or less of C, 1.0% or more and less than 2.5% of Si, 1.0% or less (excluding 0) of Mn, 0.003% or less of S, 20 to 23% of Cr, 9 to 13% of Ni, 1.0% or less (excluding 0) of W, 0.10 to 0.25% of N, and the remainder of Fe and other inevitable impurities, wherein a corrosion resistance index represented by Formula (1) below is 7 or more.

$$3*W+1.5*Si+0.1*Cr+20*N-2*Mn \tag{1}$$

In Formula (1), W, Si, Cr, N, and Mn represent the content (wt %) of each element.

In the austenitic stainless steel for a separator of a polymer fuel cell of the present disclosure, a value of Formula (2) below may be 2.0 or more.

$$\frac{\text{sum of contents (wt \%) of Si and W contained in passivated layer}}{\text{sum of contents (wt \%) of Si and W contained in matrix}} \tag{2}$$

In the austenitic stainless steel for a separator of a polymer fuel cell of the present disclosure, a value of Formula (3) below may be from 1.4 to 2.0.

$$(Cr+Mo+1.5Si+0.75\ W)/(Ni+0.5Mn+20N+24.5\ C) \tag{3}$$

In Formula (3), Cr, Mo, Si, W, Ni, Mn, N, and C represent the content (wt %) of each element.

In the austenitic stainless steel for a separator of a polymer fuel cell of the present disclosure, a thickness of a passivated layer may be 6 nm or less.

In the austenitic stainless steel for a separator of a polymer fuel cell of the present disclosure, an elongation may be 40% or more.

In the austenitic stainless steel for a separator of a polymer fuel cell of the present disclosure, a corrosion current density measured by applying a potential of 0.6 V relative to a calomel electrode for 24 hours in a mixed solution of sulfuric acid ($H_2SO_4$) having a pH of 3 and hydrofluoric acid (HF) having a pH of 5.3 at 80° C. may be 0.05 $\mu A/cm^2$ or less.

In the austenitic stainless steel for a separator of a polymer fuel cell of the present disclosure, an amount of metal melted by applying a potential of 0.6 V relative to a calomel electrode for 24 hours in a mixed solution of sulfuric acid ($H_2SO_4$) having a pH of 3 and hydrofluoric acid (HF) having a pH of 5.3 at 80° C. may be 0.7 or less relative to that of the stainless steel 316 L.

Advantageous Effects

According to the present disclosure, a stainless steel for a separator of a polymer fuel cell having superior corrosion resistance to that of the stainless steel 316 L in a sulfuric acid environment which is a fuel cell operating environment may be provided.

Specifically, a stainless steel for a separator of a polymer fuel cell having excellent corrosion resistance may be provided by adding silicon (Si) and tungsten (W) instead of expensive molybdenum (Mo) and adjusting the alloy composition in accordance with the corrosion resistance index. Also, a stainless steel for a separator of a polymer fuel cell having excellent corrosion resistance may be provided by increasing the ratio of the Si oxide and the W oxide, which are efficient for corrosion resistance, in the passivated layer relative to the matrix.

According to the present disclosure, a stainless steel for a separator of a polymer fuel cell having both excellent corrosion resistance and excellent workability may be provided.

Specifically, excellent hot workability may be obtained by controlling the fraction of delta ferrite using the ratio by the Cr equivalent and the Ni equivalent. The stainless steel for a separator of a polymer fuel cell according to an embodiment may have an elongation of 40% or more.

In addition, according to the present disclosure, a stainless steel for a separator of a polymer fuel cell having excellent corrosion resistance in a sulfuric acid environment which is a fuel cell operating environment may be provided without a separate surface refining process or coating process.

DESCRIPTION OF DRAWINGS

FIG. 1 shows graphs of the relationship between the corrosion resistance index and corrosion current density and the relationship between the corrosion resistance index and amount of melted metal relative to that of stainless steel 316 L.

FIG. 2 shows graphs of the relationship between the value of Formula (2) and corrosion current density, the relationship between the value of Formula (2) and the amount of melted metal relative to that of the stainless steel 316 L, and the relationship between the value of Formula (2) and the thickness of the passivated layer.

BEST MODE

Figure 1A:
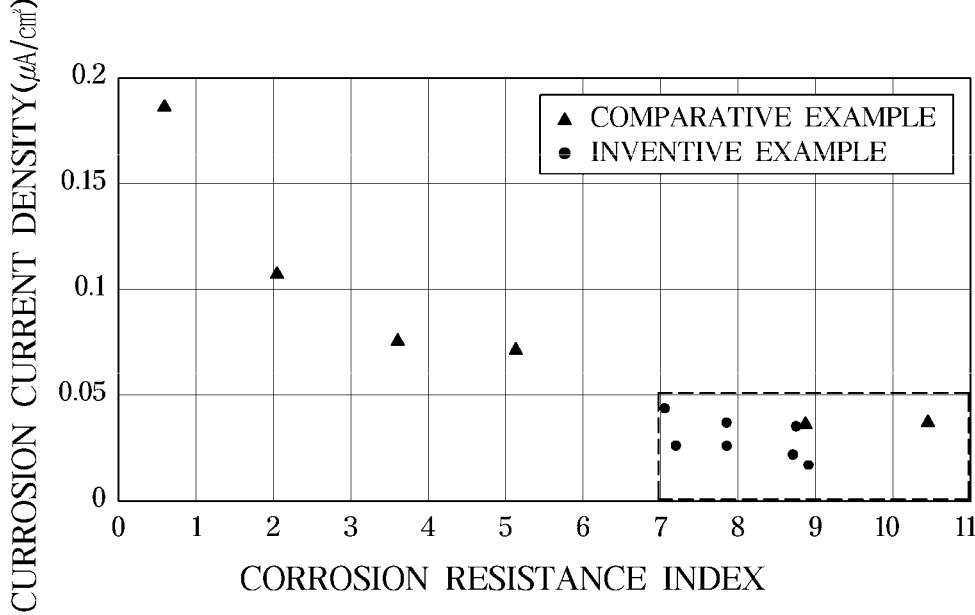
FIG. 1A is a graph showing the relationship between the corrosion resistance index and the corrosion current density.

An austenitic stainless steel for a separator of a polymer fuel cell according to an embodiment of the present disclosure includes, in percent by weight (wt %), 0.09% or less of C, 1.0% or more and less than 2.5% of Si, 1.0% or less (excluding 0) of Mn, 0.003% or less of S, 20 to 23% of Cr, 9 to 13% of Ni, 1.0% or less (excluding 0) of W, 0.10 to 0.25% of N, and the remainder of Fe and other inevitable impurities, wherein a corrosion resistance index represented by Formula (1) below is 7 or more.

$$3*W+1.5*Si+0.1*Cr+20*N-2*Mn \qquad (1)$$

In Formula (1), W, Si, Cr, N, and Mn represent the content (wt %) of each element.

Modes of the Invention

Hereinafter, preferred embodiments of the present disclosure will now be described. However, the present disclosure may be embodied in many different forms and should not be construed as being limited to the embodiments set forth herein. Rather, these embodiments are provided so that this disclosure will be thorough and complete, and will fully convey the scope of the disclosure to those skilled in the art.

The terms used herein are merely used to describe particular embodiments. Thus, an expression used in the singular encompasses the expression of the plural, unless it has a clearly different meaning in the context. In addition, it is to be understood that the terms such as "including" or "having" are intended to indicate the existence of features, steps, functions, components, or combinations thereof disclosed in the specification, and are not intended to preclude the possibility that one or more other features, steps, functions, components, or combinations thereof may exist or may be added.

Meanwhile, unless otherwise defined, all terms used herein have the same meaning as commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

In addition, the terms "about", "substantially", etc. used throughout the specification mean that when a natural manufacturing and substance allowable error are suggested, such an allowable error corresponds a value or is similar to the value, and such values are intended for the sake of clear understanding of the present invention or to prevent an unconscious infringer from illegally using the disclosure of the present invention.

In addition, as used herein, the term "stainless steel 316 L" refers to a KS standard stainless steel STS 316 L and is interpreted as a stainless steel including, in percent by weight (wt %), 0.03% or less of C, 1.0% or less of Si, 2.0% or less of Mn, 0.045% or less of P, 0.03% or less of S, 10.0 to 14.0% of Ni, 16.0 to 18.0% of Cr, and 2.0 to 3.0% of Mo. However, the stainless steel 316 L is not necessarily interpreted as being a stainless steel having the above-described composition range, but may be interpreted as a KS standard stainless steel STS316 L within a range clearly recognized by those skilled in the art.

In addition, as used herein, the term "passivated layer" refers to an oxide layer formed on the surface of a stainless steel and may also be interpreted as a passivated oxide layer formed on the surface of a stainless steel within a range clearly recognized by those skilled in the art.

Also, as used herein, the term "matrix" refers to a stainless excluding a passivated layer which is formed on the surface of the stainless steel and may also be interpreted as a stainless excluding a passivated oxide layer formed on the surface of the stainless steel within a range clearly recognized by those skilled in the art.

An austenitic stainless steel for a separator of a polymer fuel cell according to an embodiment of the present disclosure includes, in percent by weight (wt %), more than 0% and 0.09% or less of C, 1.0% or more and less than 2.5% of Si, 1.0% or less (excluding 0) of Mn, 0.003% or less of S, 20 to 23% of Cr, 9 to 13% of Ni, 1.0% or less (excluding 0) of W, 0.10 to 0.25% of N, and the remainder of Fe and other inevitable impurities.

Hereinafter, reasons for numerical limitations on the contents of elements of the alloy composition will be described in detail.

Carbon (C): 0.09 wt % or Less

C, as an austenite-forming element, is an element enhancing high-temperature strength when added. However, an excess of C reacts with Cr contained in a steel to form a Cr carbide, and thus corrosion resistance deteriorates in a region where Cr is depleted. Therefore, in the present disclosure, it is preferable to control the C content as low as possible and the C content is controlled to 0.09 wt % or less in the present disclosure.

Silicon (Si): 1.0 wt % or More and Less than 2.5 wt %

Si is an element enhancing corrosion resistance of a stainless steel. Particularly, Si is an element enhancing corrosion resistance in a sulfuric acid environment. According to the present disclosure, to obtain excellent corrosion resistance in a sulfuric acid environment which is a fuel cell operating environment, Si is actively added in an amount of 1.0 wt % in the present disclosure. When the Si content is less than 1.0 wt %, sufficient corrosion resistance cannot be obtained in a sulfuric acid environment which is a fuel cell operating environment.

However, an excess of Si deteriorates elongation and deteriorates corrosion resistance by forming an $SiO_2$ oxide, and thus the Si content is controlled to be less than 2.5 wt %. As described above, elongation and corrosion resistance may deteriorate when the Si content is excessive, and thus it is preferable to control the Si content to 2.0 wt % or less.

Manganese (Mn): 1.0 wt % or Less (Excluding 0)

Mn, as an austenite-stabilizing element, is an element replacing expensive Ni. However, an excess of Mn deteriorates corrosion resistance, and thus the Mn content is controlled to 1.0 wt % or less in the present disclosure.

Sulfur (S): 0.003 wt % or Less

S, which is an impurity element contained in a trace amount, is segregated in grain boundaries, as a main element causing cracking during hot rolling. Therefore, an upper limit of the S content is controlled as low as possible not more than 0.003%.

Chromium (Cr): 20 to 23 wt %

Cr is an element forming a Cr oxide on the surface of a steel, thereby enhancing corrosion resistance and should be added in an amount of 20 wt % or more to obtain corrosion resistance in a fuel cell operating environment which is a strongly acidic environment. However, Cr is excessively added, expensive Ni, Mn deteriorating corrosion resistance, and N deteriorating workability should be additionally added to stabilize an austenite phase. Therefore, the Cr content is controlled to 23 wt % or less in the present disclosure in consideration thereof.

Nickel (Ni): 9 to 13 wt %

Although Ni is added to stabilize an austenite phase, N is expensive. Thus, an upper limit of the Ni content is controlled to 13 wt % in the present disclosure in consideration of economic feasibility. However, when the Ni content is excessively decreased, Mn deteriorating corrosion resistance and N deteriorating workability should be additionally added to stabilize the austenite phase. Therefore, a lower limit of the Ni content is controlled to 9 wt % in the present disclosure in consideration thereof.

Tungsten (W): 1.0 wt % or Less (Excluding 0)

W, as an element enhancing corrosion resistance of a stainless steel, has excellent price competitiveness because the effect of W on enhancing corrosion resistance is greater than that of Mo, even with a smaller amount than Mo. However, an excess of W promotes formation of a sigma phase that deteriorates mechanical properties of a steel, and therefore an upper limit of W may be controlled to 1.0 wt %.

Nitrogen (N): 0.10 to 0.25 wt %

N, as an austenite phase-stabilizing element, is an element capable of replacing Ni that is an expensive austenite phase-stabilizing element. In addition, because N is an element enhancing strength and pitting corrosion resistance when added, the N content is controlled to 0.10 wt % or more in the present disclosure. To enhance corrosion resistance, it is preferable to control the N content to 0.15 wt % or more.

However, an excess of N deteriorates workability such as elongation, and thus an upper limit of the N content is controlled to 0.25 wt % in the present disclosure.

The remaining component of the composition of the present disclosure is iron (Fe). However, the composition may include unintended impurities inevitably incorporated from raw materials or surrounding environments, and thus addition of impurities is not excluded. The impurities are not specifically mentioned in the present disclosure, as they are known to any person skilled in the art of manufacturing.

In the austenitic stainless steel for a separator of a polymer fuel cell of the present disclosure having the above-described alloy composition, the corrosion resistance index represented by Formula (1) may be 7 or more.

$$3*W+1.5*Si+0.1*Cr+20*N-2*Mn \tag{1}$$

In Formula (1), W, Si, Cr, N, and Mn represent the content (wt %) of each element.

Formula (1) above is designed by the present inventors to obtain a stainless steel having excellent corrosion resistance in a fuel cell operating environment which is a strongly acidic environment. In Formula (1), the coefficient multiplied by the content of each alloying element means a weight of the alloying element controlled in the stainless steel of the present disclosure to obtain corrosion resistance.

For example, W, Si, Cr, and N are elements enhancing corrosion resistance and coefficients multiplied by the contents of these elements in Formula (1) are positive numbers. On the contrary, although Mn is an austenite phase-stabilizing element, corrosion resistance is deteriorated thereby, and thus the coefficient multiplied by the Mn content in Formula (1) is a negative number.

As the corrosion resistance index represented by Formula (1) increases, corrosion resistance is more enhanced. However, it should be noted that the contents of W, Si, Cr, N, and Mn of Formula (1) are controlled within the above-described ranges.

According to the present disclosure, an austenitic stainless steel for a separator of a polymer fuel cell having excellent corrosion resistance in a fuel cell operating environment which is a strongly acidic environment may be provided by controlling the corrosion resistance index represented by Formula (1) to 7 or more.

The passivated layer of a stainless steel is formed on the surface of the stainless steel and prevents exposure of a matrix in a corrosive environment. Accordingly, corrosion resistance of a stainless steel is determined by the degree of corrosion stability of a passivated layer formed on the surface of the stainless steel in a corrosive environment.

In addition, to obtain excellent corrosion resistance in a sulfuric acid environment which is a fuel cell operating environment, it is preferable that Si, as an element providing excellent corrosion resistance in a sulfuric acid environment, is contained in the passivated layer in a large quantity.

In consideration of the above-described properties, the present inventors have derived Formula (2) below to control the passivated layer to contain large amounts of Si and W, which provide excellent corrosion resistance.

$$\frac{\text{sum of contents (wt \%) of Si and W contained in passivated layer}}{\text{sum of contents (wt \%) of Si and W contained in matrix}} \quad (2)$$

A higher value of Formula (2) indicates that the ratio of Si and W, which provide excellent corrosion resistance and are in the form of oxides in the passivated layer, is higher than a ratio thereof in the matrix.

In the austenitic stainless steel for a separator of a polymer fuel cell according to an embodiment of the present disclosure, the value of Formula (2) may be 2.0 or more. When the value of Formula (2) is less than 2.0, it is difficult to obtain sufficient corrosion resistance in the fuel cell operating environment.

The passivated layer of the stainless steel is an oxide layer formed as metal elements such as Fe, Cr, Si, and W contained in the matrix are oxidized in the case where the matrix is exposed to a corrosive environment. Because the Fe oxide has many defects therein and is not dense, oxygen penetrating into the matrix cannot be blocked thereby, so that the passivated layer continuously grow. On the contrary, because the Cr oxide, the Si oxide, and the W oxide are denser than the Fe oxide, oxygen penetrating into the matrix is blocked by these metal oxides, thereby inhibiting the growth of the passivated layer.

In the case where the value of Formula (2) according to the present disclosure is 2.0 or more, the Si oxide and the W oxide, which are denser than the Fe oxide, are formed in the passivated layer in large quantities to block penetration of oxygen into the matrix, thereby inhibiting the growth of the passivated layer. According to an embodiment, the growth of the passivated layer is inhibited, so that a thin, dense passivated layer may be formed to a thickness of 6 nm or less.

The austenitic stainless steel for a separator of a polymer fuel cell including the alloy composition and satisfying the vales of Formulae (1) and (2) as defined in the present disclosure has excellent corrosion resistance.

According to an embodiment, the fuel cell operating environment may be prepared by applying a potential of 0.6 V relative to a calomel electrode for 24 hours in a mixed solution of sulfuric acid ($H_2SO_4$) having a pH of 3 and hydrofluoric acid (HF) having a pH of 5.3 at 80° C.

According to an embodiment of the present disclosure, a corrosion current density measured in the prepared environment may be 0.05 $\mu A/cm^2$ of less, and an amount of metals melted in the environment may be 0.7 or less relative to that of the stainless steel 316 L.

Even when a stainless steel has excellent corrosion resistance, poor workability may cause surface defects such as cracks occurring at edges or surfaces during a process of manufacturing thin separators of fuel cells, thereby decreasing actual yields. Such cacks are highly likely to occur during a hot rolling process in the manufacturing process and hot workability needs to be improved to apply the stainless steel to a material of a thin separator of a fuel cell.

It has been found that frequency of occurrence of surface defects of the austenitic stainless steel such as cracks at edges or surfaces is determined by a fraction of delta ferrite present in a microstructure of the stainless steel. Specifically, as the fraction of delta ferrite is too high, the possibility that surface defects occur at edges or surfaces increases by rolling a two-phase area of austenite and delta ferrite. On the contrary, as the fraction of delta ferrite is too low, austenite grains coarsen, thereby increasing the possibility that surface defects occur. Therefore, the fraction of delta ferrite formed during solidification needs to be appropriately adjusted.

The present inventors have found that the fraction of delta ferrite is particularly affected by a Cr equivalent and an Ni equivalent. Based thereon, an attempt has been made to form an appropriate fraction of delta ferrite by controlling the value of Formula (3) below.

$$(\text{Cr+Mo+1.5Si+0.75 W})/(\text{Ni+0.5Mn+20N+24.5 C}) \quad (3)$$

In Formula (3), Cr, Mo, Si, W, Ni, Mn, N, and C represent the content (wt %) of each element.

The numerator '(Cr+Mo+1.5Si+0.75 W)' of Formula (3) represents the Cr equivalent ($Cr_{eq}$), and the denominator '(Ni+0.5Mn+20N+24.5 C)' represents the Ni equivalent ($Ni_{eq}$). The Cr equivalent is an index converted from the influence of alloying elements inducing formation of ferrite, and the Ni equivalent is an index converted from the influence of alloying elements inducing formation of austenite. When the value of Formula (3) increases, the fraction of delta ferrite increases. When the value of Formula (3) decreases, the fraction of delta ferrite decreases.

According to an embodiment of the present disclosure, the value of Formula (3) may be from 1.4 to 2.0. When the value of Formula (3) is less than 1.4, the fraction of delta ferrite is too low, hot workability deteriorates due to coarsening of austenite grains, thereby increasing the possibility that surface defects occur. On the contrary, when the value of Formula (3) exceeds 2.0, the fraction of delta ferrite is too high, thereby increasing the possibility that surface defects occur during hot rolling.

The austenitic stainless steel for a separator of a polymer fuel cell satisfying the range of Formula (3) defined in the present disclosure as described above has excellent hot workability.

According to an embodiment, the austenitic stainless steel for a separator of a polymer fuel cell of the present disclosure may have an elongation of 40% or more. When the elongation is less than 40%, the stainless steel cannot have sufficient workability and thus cannot be processed into a thin separator for polymer fuel cells. Therefore, it is not suitable for a stainless steel for a separator of a polymer fuel cell.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLES

Steels having the compositions as shown in Table 1 below were rolled by a rough mill and a continuous finish mill to prepare a hot-rolled stainless steel sheet, followed by annealing and acid pickling. In addition, corrosion resistance index of each of the steels according to the inventive examples and comparative examples defined by Formula (1) below are shown in Table 1.

$$3*W+1.5*Si+0.1*Cr+20*N-2*Mn \qquad (1)$$

TABLE 1

| Steel type | C | Si | Mn | Cr | Ni | W | N | Mo | Corrosion resistance index |
|---|---|---|---|---|---|---|---|---|---|
| Inventive Example 1 | 0.015 | 1.5 | 0.8 | 20 | 10 | 0.4 | 0.16 | 0 | 7.05 |
| Inventive Example 2 | 0.017 | 1.1 | 0.9 | 23 | 12 | 0.5 | 0.21 | 0 | 7.85 |
| Inventive Example 3 | 0.017 | 1.5 | 0.8 | 23 | 12 | 0.1 | 0.23 | 0 | 7.85 |
| Inventive Example 4 | 0.018 | 1.5 | 0.5 | 23 | 12 | 0.2 | 0.23 | 0 | 8.75 |
| Inventive Example 5 | 0.060 | 1.0 | 0.5 | 22 | 11 | 0.5 | 0.15 | 0 | 7.2 |
| Inventive Example 6 | 0.060 | 2.0 | 0.5 | 22 | 11 | 0.5 | 0.15 | 0 | 8.7 |
| Inventive Example 7 | 0.019 | 1.4 | 1.0 | 22 | 12 | 0.8 | 0.21 | 0 | 8.9 |
| Comparative Example 1 | 0.050 | 0.4 | 1.2 | 18 | 8 | 0 | 0.03 | 0 | 0.6 |
| Comparative Example 2 | 0.013 | 0.5 | 1.3 | 20.5 | 10 | 0 | 0.17 | 0 | 3.6 |
| Comparative Example 3 | 0.025 | 0.4 | 0.9 | 21.3 | 10.3 | 0 | 0.21 | 0.6 | 5.13 |
| Comparative Example 4 | 0.020 | 1.5 | 0.5 | 26 | 15 | 0 | 0.25 | 0 | 8.85 |
| Comparative Example 5 | 0.021 | 1.5 | 0.5 | 28 | 16 | 0 | 0.32 | 0 | 10.45 |
| 316L | 0.015 | 0.6 | 0.7 | 17.5 | 10 | 0 | 0.04 | 2.0 | 2.05 |

Physical properties of steels having the alloy compositions shown in Table 1 according to the inventive examples and comparative examples will be evaluated.

(1) Evaluation of Corrosion Resistance

In order to evaluate corrosion resistance of each of the steels according to the inventive examples and comparative examples having the alloy compositions as shown in Table 1, an environment similar to the fuel cell operating environment was prepared. Specifically, the environment is prepared by applying a potential of 0.6 V relative to a calomel electrode for 24 hours in a mixed solution of sulfuric acid (H$_2$SO$_4$) having a pH of 3 and hydrofluoric acid (HF) having a pH of 5.3 at 80° C.

The value of Formula (2) shown in Table 2 is a value calculated by substituting a sum of the contents (wt %) of Si and W contained in the passivated layer and a sum of the contents (wt %) of Si and W contained in the matrix into Formula (2) below.

$$\frac{\text{sum of contents (wt \%) of Si and W contained in passivated layer}}{\text{sum of contents (wt \%) of Si and W contained in matrix}} \qquad (2)$$

In addition, to evaluate corrosion resistance, corrosion current densities and amounts of melted metals measured in the environment prepared as described above are shown in Table 2 below. The 'amount of melted metal relative to 316 L' of Table 2 indicates a relative ratio of the amount of melted metals according to the inventive examples and comparative examples relative to an amount of melted metals of the stainless steel 316 L, based on the amount of melted metal of the stainless steel 316 L in the environment prepared as described above.

TABLE 2

| Example | Formula (2) | Corrosion current density ($\mu$A/cm$^2$) | Amount of melted metal relative to 316L | Thickness of passivated layer (nm) |
|---|---|---|---|---|
| Inventive Example 1 | 2.6 | 0.044 | 0.70 | 4.8 |
| Inventive Example 2 | 2.1 | 0.026 | 0.52 | 5.5 |
| Inventive Example 3 | 2.2 | 0.037 | 0.66 | 5.1 |
| Inventive Example 4 | 2.2 | 0.035 | 0.63 | 5.0 |
| Inventive Example 5 | 2.0 | 0.026 | 0.59 | 5.7 |
| Inventive Example 6 | 3.1 | 0.022 | 0.45 | 4.1 |
| Inventive Example 7 | 2.6 | 0.017 | 0.39 | 4.6 |
| Comparative Example 1 | 1.3 | 0.186 | 2.45 | 7.3 |
| Comparative Example 2 | 1.5 | 0.075 | 1.04 | 6.6 |
| Comparative Example 3 | 1.3 | 0.071 | 0.92 | 6.2 |
| Comparative Example 4 | 2.2 | 0.036 | 0.54 | 3.8 |
| Comparative Example 5 | 2.3 | 0.037 | 0.56 | 3.4 |
| 316L | 1.5 | 0.107 | 1.00 | 6.7 |

Referring to Table 2, it was confirmed that the corrosion current density of Inventive Examples 1 to 7 decreased by 50% or more when compared to the corrosion current density of the stainless steel 316 L, and the amount of melted metals thereof relative to the stainless steel 316 L was 0.7 or less. Based on the results, it was confirmed that the stainless steel satisfying the alloy composition and the values of Formulas (1) and (2) according to the present disclosure had superior corrosion resistance to that of the stainless steel 316 L even in the fuel cell operating environment which is a strongly acidic environment.

Meanwhile, referring to Table 2, unlike the ranges of the Si content and the W content defined in the present disclosure, the Si content was less than 1.0 wt % or W was not contained in Comparative Examples 1 to 3. Also, in Comparative Examples 1 to 3, corrosion resistance index obtained by Formula (1) was less than 7, and the value of Formula (2) was less than 2.0, indicating poor corrosion resistance.

Specifically, the corrosion current density rather increased or the decrease in corrosion resistance was small as 30% or less in Comparative Examples 1 to 3 compared to that of the stainless steel 316 L. In addition, referring to Table 2, it was confirmed that in Comparative Examples 1 to 3, amounts of melted metal rather increased or similar to that of the stainless steel 316 L. In addition, the value of Formula (2) was less than 2.0 in Comparative Examples 1 to 3, and thus it was confirmed that the oxide of the passivated layer was not dense, resulting that the passivated layer grew to a thickness greater than 6 nm.

Based on the results, corrosion may occur in the case of using the steels according to Comparative Examples 1 to 3 in the fuel cell operating environment, which is a strongly acidic environment, and thus the steels are not suitable for separators of fuel cells.

Particularly, although the steel of Comparative Example 3 contains Mo, like the stainless steel 316 L, the corrosion current density and the amount of melted metal relative to the stainless steel 316 L were greater than those of the present disclosure. Therefore, it was confirmed that it is difficult to obtain corrosion resistance by adding Mo.

The above-described results may be visually confirmed with reference to FIGS. 1 and 2.

Figure 1B:
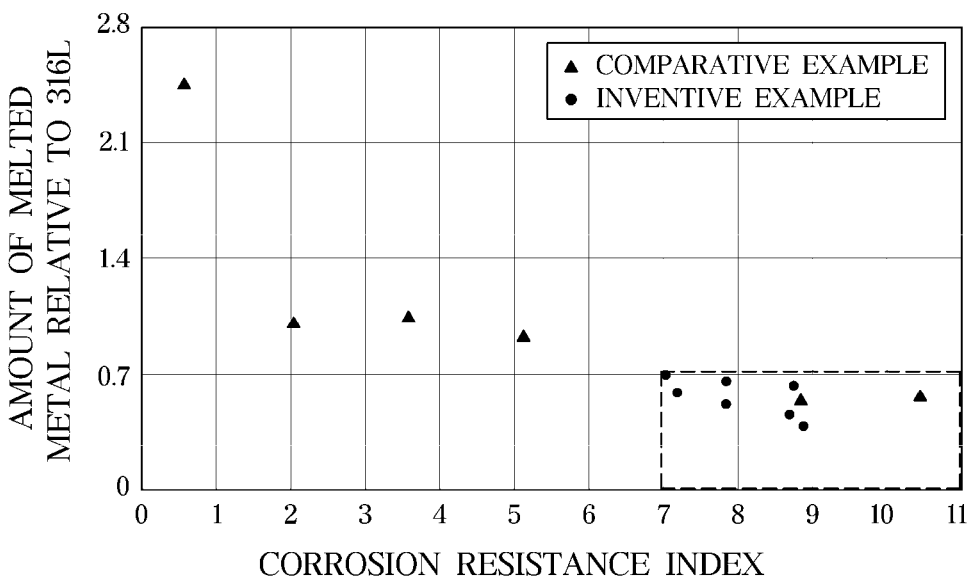
FIG. 1B is a graph showing the relationship between the corrosion resistance index and the amount of melted metal relative to that of the stainless steel 316 L.

FIG. 1 shows graphs of the relationship between the corrosion resistance index and corrosion current density and the relationship between the corrosion resistance index and amount of melted metal relative to that of stainless steel 316 L. FIG. 1A is a graph showing the relationship between the corrosion resistance index and the corrosion current density, and FIG. 1B is a graph showing the relationship between the corrosion resistance index and the amount of melted metal relative to that of the stainless steel 316 L.

Referring to an area marked by the dashed line of FIG. 1A, it may be confirmed that the corrosion current density was 0.05 $\mu A/cm^2$ or less in the case where the corrosion resistance index is 7 or more. In addition, referring to an area marked by the dashed line of FIG. 1B, the amount of melted metal relative to that of the stainless steel 316 L is 0.7 or less in the case where the corrosion resistance index is 7 or more. Referring to FIGS. 1A and 1B, it may be confirmed that the corrosion resistance index of Formula (1) should be controlled to 7 or more to obtain excellent corrosion resistance.

Figure 2A:
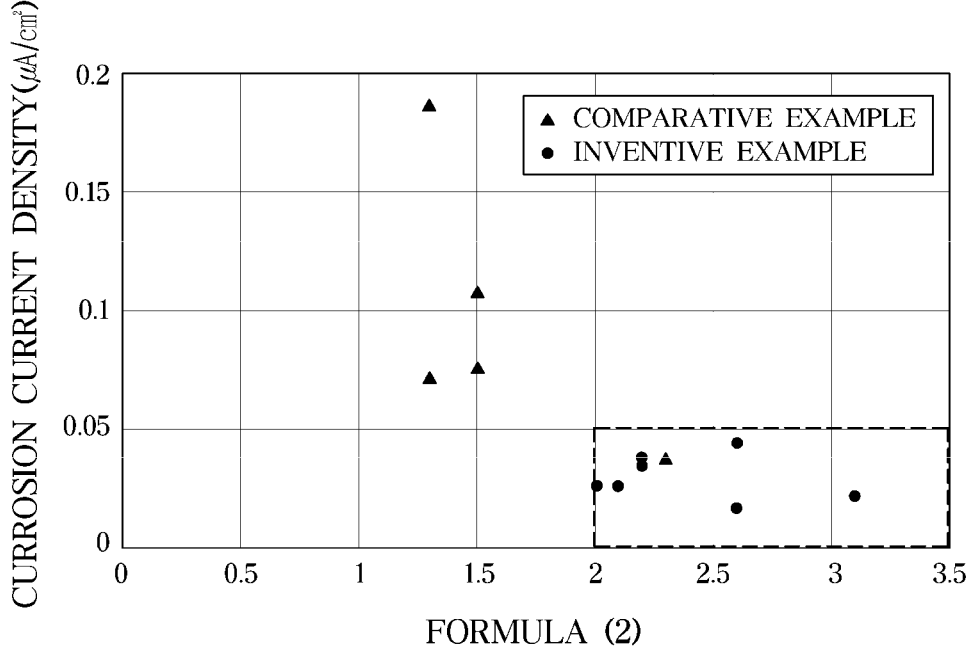
FIG. 2A is a graph showing the relationship between the value of Formula (2) and corrosion current density.
Figure 2B:
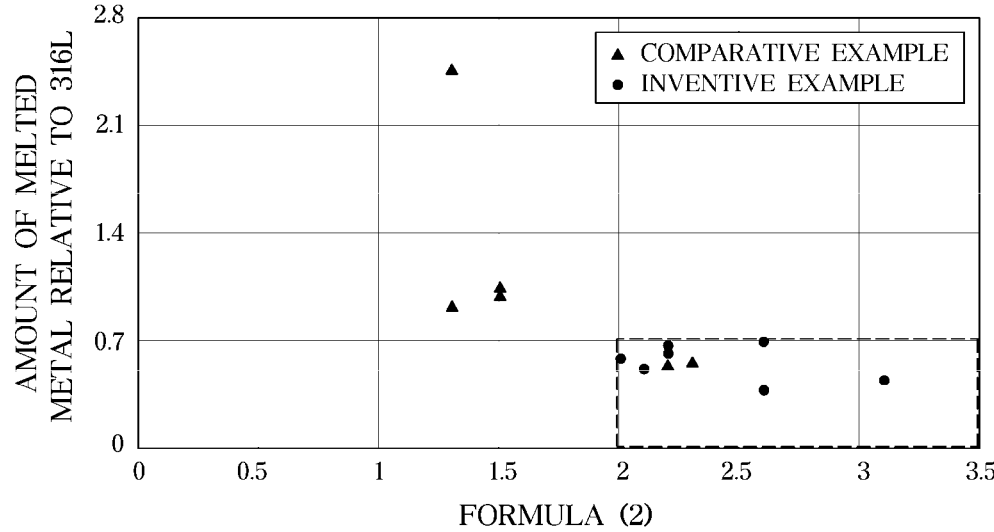
FIG. 2B is a graph showing the relationship between the value of Formula (2) and the amount of melted metal relative to that of the stainless steel 316 L.
Figure 2C:
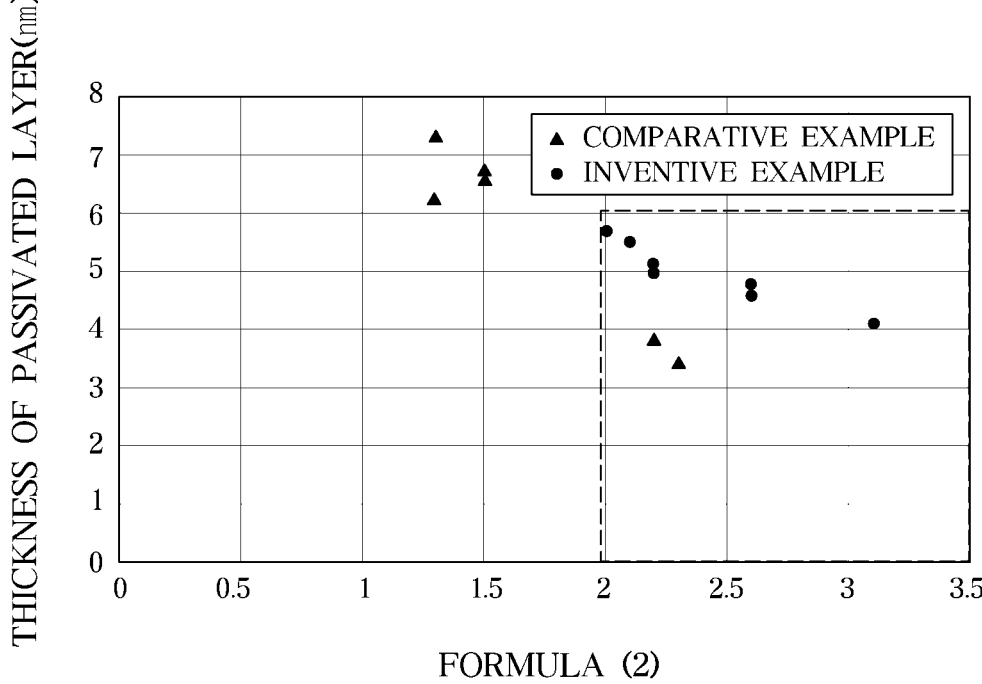
FIG. 2C is a graph showing the relationship between the value of Formula (2) and the thickness of the passivated layer.

FIG. 2 shows graphs of the relationship between the value of Formula (2) and corrosion current density, the relationship between the value of Formula (2) and the amount of melted metal relative to that of the stainless steel 316 L, and the relationship between the value of Formula (2) and the thickness of the passivated layer. FIG. 2A is a graph showing the relationship between the value of Formula (2) and corrosion current density, FIG. 2B is a graph showing the relationship between the value of Formula (2) and the amount of melted metal relative to that of the stainless steel 316 L, and FIG. 2C is a graph showing the relationship between the value of Formula (2) and the thickness of the passivated layer.

Referring to the area marked by the dashed line of FIG. 2A, it is confirmed that the corrosion current density is 0.05 $\mu A/cm^2$ or less in the case where the value of Formula (2) is 2 or more. In addition, referring to the area marked by the dashed line in FIG. 2B, it is confirmed that the amount of melted metal relative to that of the stainless steel 316 L is 0.7 or less in the case where the value of Formula (2) is 2 or more. In addition, referring to the area marked by the dashed line in FIG. 2C, it is confirmed that the thickness of the passivated layer is 6 mm or less in the case where the value of Formula (2) is 2 or more. Referring to FIGS. 2A, 2B, and 2C, it is confirmed that it is preferable to control the value of Formula (2) to 2 or more to obtain excellent corrosion resistance.

Meanwhile, referring to Table 2, it confirmed that corrosion current densities of Comparative Examples 4 and 5 decrease compared to that of the stainless steel 316 L and the amounts of melted metal relative to that of the stainless steel 316 L decrease compared to that of the stainless steel 316 L.

However, in order to be used as a material of a thin separator of a fuel cell, sufficient workability should be obtained. In this view point, although the steels of Comparative Examples 4 and 5 have excellent corrosion resistance, it is confirmed that the steels of Comparative Examples 4 and 5 were not suitable as materials of separators of fuel cells due to insufficient workability as described in the results of '(2) Evaluation of Workability' below. Hereinafter, detailed descriptions thereof will be given.

(2) Evaluation of Workability

To evaluate hot workability of the steels of the inventive examples and comparative examples, occurrence of surface defects after hot rolling the steels was shown in Table 3 below.

The value of Formula (3) in Table 3 was obtained by substituting the contents (wt %) of the alloying elements of Table 1 to Formula (3) below.

$$(Cr+Mo+1.5Si+0.75\ W)/(Ni+0.5Mn+20N+24.5\ C) \qquad (3)$$

Surface defects was determined based on occurrence of surface defects such as cracks at edges or surfaces of the hot-rolled stainless steel.

TABLE 3

| Example | Formula (3) | Occurrence of surface defects (○/X) |
|---|---|---|
| Inventive Example 1 | 1.61 | X |
| Inventive Example 2 | 1.47 | X |
| Inventive Example 3 | 1.45 | X |
| Inventive Example 4 | 1.47 | X |
| Inventive Example 5 | 1.52 | X |
| Inventive Example 6 | 1.61 | X |
| Inventive Example 7 | 1.44 | X |
| Comparative Example 1 | 1.78 | X |
| Comparative Example 2 | 1.48 | X |
| Comparative Example 3 | 1.45 | X |
| Comparative Example 4 | 1.36 | ○ |
| Comparative Example 5 | 1.31 | ○ |
| 316L | 1.77 | X |

Referring to Table 3, when the value of Formula (3) is 1.4 or more, surface defects were not observed after hot rolling, and thus it is confirmed excellent hot workability was obtained.

On the contrary, although excellent hot workability was obtained in Comparative Examples 1 to 3 and STS 316 L since no surface defects were observed and the value of Formula (3) was 1.4 or more, corrosion resistance was not enough to be used as a separator of a fuel cell as evaluated in the '(1) Evaluation of Corrosion Resistance' above.

Although sufficient corrosion resistance was obtained in Comparative Examples 4 and 5 by adding an excess of Cr as described above in '(1) Evaluation of Corrosion Resistance', Ni and N were excessively added for stabilization of the austenite phase as a result of adding the excess of Cr. Therefore, the value of Formula (3) was 1.4 or less in accordance with the increase in the Ni equivalent, and poor workability was obtained due to a too small fraction of delta ferrite, and accordingly surface defects occurred.

Based on these results, addition of excessive Cr and N should be inhibited to obtain not only sufficient corrosion resistance but also sufficient hot workability, and it is preferable to control the alloy composition range and the value of Formula (3) as defined by the present disclosure.

Based on the above examples and the evaluation results thereof, a stainless steel having the alloy composition and satisfying the values of Formulae (1), (2), and (3) defined in the present disclosure may have excellent corrosion resistance and workability, and thus it may be confirmed that the stainless steel is suitable for a separator of a polymer electrolyte fuel cell.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

The stainless steel for a separator of a polymer fuel cell according to the present disclosure may be applied to a separator of a polymer electrolyte membrane fuel cell.

The invention claimed is:

1. An austenitic stainless steel for a separator of a polymer fuel cell comprising, a matrix comprising, in percent by weight (wt %), 0.09% or less of C, 1.0% or more and less than 2.5% of Si, 1.0% or less (excluding 0) of Mn, 0.003% or less of S, 20 to 23% of Cr, 9 to 13% of Ni, 1.0% or less (excluding 0) of W, 0.10 to 0.25% of N, less than 0.6% of Mo and the remainder of Fe and other inevitable impurities; and a passivated layer formed on a surface of the matrix in a form of oxide layer, wherein a corrosion resistance index represented by Formula (1) below is 7 or more, and wherein a value of Formula (2) below is 2.0 or more, and wherein a value of Formula (3) below is from 1.4 to 2.0, and wherein a thickness of the passivated layer is 6 nm or less:

$$3*W+1.5*Si+0.1*Cr+20*N-2*Mn \qquad \text{Formula (1)}$$

(wherein in Formula (1), W, Si, Cr, N, and Mn represent the content (wt %) of each element), $$\frac{\text{sum of contents (wt \%) of Si and W contained in passivated layer}}{\text{sum of contents (wt \%) of Si and W contained in matrix}}, \qquad \text{Formula (2)}$$

$$(Cr+Mo+1.5Si+0.75\ W)/(Ni+0.5Mn+20N+24.5\ C) \qquad \text{Formula (3)}$$

(wherein in Formula (3), Cr, Mo, Si, W, Ni, Mn, N, and C represent the content (wt %) of each element).

2. The austenitic stainless steel according to claim 1, wherein an elongation is 40% or more.

3. The austenitic stainless steel according to claim 1, wherein a corrosion current density measured by applying a potential of 0.6 V relative to a calomel electrode for 24 hours in a mixed solution of sulfuric acid ($H_2SO_4$) having a pH of 3 and hydrofluoric acid (HF) having a pH of 5.3 at 80° C. is 0.05 $\mu A/cm^2$ or less.

4. The austenitic stainless steel according to claim 1, wherein an amount of metal melted by applying a potential of 0.6 V relative to a calomel electrode for 24 hours in a mixed solution of sulfuric acid ($H_2SO_4$) having a pH of 3 and hydrofluoric acid (HF) having a pH of 5.3 at 80° C. is 0.7 or less relative to that of the stainless steel 316L.

* * * * *